United States Patent
Luan et al.

(10) Patent No.: US 12,303,820 B2
(45) Date of Patent: May 20, 2025

(54) VOLTAGE-SWING METHOD FOR CARBON CAPTURE USING POROUS CARBONS

(71) Applicant: INTERNATIONAL BUSINESS MACHINES CORPORATION, Armonk, NY (US)

(72) Inventors: Binquan Luan, Chappaqua, NY (US); Bruce Gordon Elmegreen, Goldens Bridge, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 17/808,572

(22) Filed: Jun. 24, 2022

(65) Prior Publication Data

US 2023/0415088 A1    Dec. 28, 2023

(51) Int. Cl.
| | |
|---|---|
| *B01D 53/04* | (2006.01) |
| *B01D 53/047* | (2006.01) |
| *B01D 53/32* | (2006.01) |

(52) U.S. Cl.
CPC ..... *B01D 53/0407* (2013.01); *B01D 53/0462* (2013.01); *B01D 53/047* (2013.01); *B01D 53/323* (2013.01); *B01D 2253/102* (2013.01); *B01D 2253/108* (2013.01); *B01D 2253/204* (2013.01); *B01D 2257/504* (2013.01); *B01D 2259/40083* (2013.01); *B01D 2259/812* (2013.01)

(58) Field of Classification Search
CPC .............. B01D 53/0407; B01D 53/047; B01D 53/0462; B01D 53/323
See application file for complete search history.

(56) References Cited

U.S. PATENT DOCUMENTS

| | | |
|---|---|---|
| 7,553,352 B2 | 6/2009 | Mueller |
| 7,799,120 B2 | 9/2010 | Yaghi |
| 8,088,197 B2 | 1/2012 | Wright |
| 8,142,745 B2 | 3/2012 | Reyes |
| 8,500,855 B2 | 8/2013 | Eisenberger |
| 8,889,589 B2 | 11/2014 | Li |

(Continued)

FOREIGN PATENT DOCUMENTS

| | | |
|---|---|---|
| CN | 101346183 A | 1/2009 |
| CN | 101848754 A | 9/2010 |

(Continued)

OTHER PUBLICATIONS

International Searching Authority, "Notification of Transmittal of the International Search Report and the Written Opinion of the International Searching Authority, or Declaration," Patent Cooperation Treaty, Jul. 7, 2023, 11 pages, International Application No. CN/CN2023/088825.

(Continued)

*Primary Examiner* — Robert A Hopkins
(74) *Attorney, Agent, or Firm* — Robert D. Bean (57) ABSTRACT

A method and system for carbon capture through a voltage-swing is provided. The present invention may include capturing carbon dioxide from a gas mixture through physisorption by applying a positive electrical charge to a sorbent to increase the sorbent's selectivity and adsorption and liberating the carbon dioxide from the sorbent by removing the positive electrical charge from the sorbent and applying a desorption method to the sorbent.

18 Claims, 4 Drawing Sheets

(56) References Cited

U.S. PATENT DOCUMENTS

| | | | |
|---|---|---|---|
| 10,464,018 | B2 | 11/2019 | Voskian |
| 10,625,209 | B2 | 4/2020 | Stern |
| 11,041,420 | B2 | 6/2021 | Williams |
| 2018/0085703 | A1* | 3/2018 | Landskron ........... B01D 53/326 |
| 2018/0222781 | A1 | 8/2018 | Liu |
| 2020/0023307 | A1 | 1/2020 | Voskian |
| 2020/0086257 | A1 | 3/2020 | Liu |

FOREIGN PATENT DOCUMENTS

| | | |
|---|---|---|
| CN | 102671506 A | 9/2012 |
| CN | 102773162 A | 11/2012 |
| CN | 106552497 A | 4/2017 |
| EP | 2253915 B1 | 6/2018 |
| WO | 2006082436 A1 | 8/2006 |
| WO | 2012145407 A2 | 10/2012 |
| WO | 2021142474 A1 | 7/2021 |
| WO | 2022115773 A1 | 6/2022 |

OTHER PUBLICATIONS

Biswal, et al., "Versatility, Cost Analysis, and Scale-up in Fluoride and Arsenic Removal Using Metal-organic Framework-based Adsorbents," Civil & Environmental Engineering Faculty Publications, 2021, 81 pages.

Datta, et al., "Electrochemical CO2 Capture Using Resin-Wafer Electrodeionization," Industrial & Engineering Chemistry Research [article], Oct. 2013, 42 pages, vol. 52, DOI:10.1021/ie402538d, Retrieved from the Internet: <URL: https://www.researchgate.net/publication/263957338_Electrochemical_CO2_Capture_Using_Resin-Wafer_Electrodeionization>.

De Mot, et al., "Influence of flow and pressure distribution inside a gas diffusion electrode on the performance of a flow-by CO2 electrolyzer," Chemical Engineering Journal, Dec. 2019, vol. 378, Retrieved from the Internet: <URL: https://www.sciencedirect.com/science/article/abs/pii/S1385894719316183>.

Digdaya, et al., "A direct coupled electrochemical system for capture and conversion of CO2 from oceanwater", Nature Communications [article], Sep. 2020, 11 pages, vol. 11, No. 1, DOI:10.1038/s41467-020-18232-y, Retrieved from the Internet: <URL: https://www.researchgate.net/publication/344137439_A_direct_coupled_electrochemical_system_for_capture_and_conversion_of_CO2_from_oceanwater>.

Dimascio, et al., "Extraction of Carbon Dioxide from Seawater by an Electrochemical Acidification Cell. Part 1—Initial Feasibility Studies", Ocean Chemistry Project [article], Jul. 2010, 26 pages, Retrieved from the Internet: <URL: https://www.researchgate.net/publication/235185675_Extraction_of_Carbon_Dioxide_from_Seawater_by_an_Electrochemical_Acidification_Cell_Part_1_-_Initial_Feasibility_Studies>.

Eisaman, et al., "Energy-efficient electrochemical CO 2 capture from the atmosphere," Jan. 2009, 5 pages, Retrieved from the Internet: <URL: https://www.researchgate.net/publication/237623469_Energy-efficient_electrochemical_CO_2_capture_from_the_atmosphere>.

Eisaman, et al., CO2 desorption using high-pressure bipolar membrane electrodialysis, Energy & Environmental Science [article], Sep. 2011, vol. 4, Issue 10, DOI:10.1039/C1EE01336J, Retrieved from the Internet: <URL: https://www.researchgate.net/publication/254199805_CO2_desorption_using_high-pressure_bipolar_membrane_electrodialysis>.

Huebscher, et al., "Electrochemical Concentration and Separation of Carbon Dioxide for Advanced Life Support Systems—Carbonation Cell System," SAE Transactions [journal article], 1696, pp. 2164-2170, vol. 78, Sec. 4, Retrieved from the Internet: <URL: https://www.jstor.org/stable/44644207>.

Kang, et al., "Concentration of carbon dioxide by a high-temperature electrochemical membrane cell," Journal of Applied Electrochemistry [papers], May 1985, pp. 431-439, vol. 15, Retrieved from the Internet: <URL: https://link.springer.com/article/10.1007/BF00615996>.

Legrand, et al., "Solvent free CO2 capture using Membrane Capacitive Deionization (MCDI)," Environmental Science and Technology [article], Jul. 2018, 31 pages, vol. 52, DOI: 10.1021/acs.est.8b00980, Retrieved from the Internet: <URL: https://www.researchgate.net/publication/326341698_Solvent_free_CO2_capture_using_Membrane_Capacitive_Deionization_MCDI>.

Li, et al., "Electrolytic Conversion of Bicarbonate into CO in a Flow Cell," Joule [article], Jun. 2019, DOI:10.1016/j.oule.2019.05.021, Retrieved from the Internet: <URL: https://www.researchgate.net/publication/333737539_Electrolytic_Conversion_of_Bicarbonate_into_CO_in_a_Flow_Cell>.

Reinhardt, et al., "Electrochemical Capture and Release of Carbon Dioxide," ACS Energy Letters [perspective], 2017 [accessed on Apr. 26, 2022], pp. 454-461, Retrieved from the Internet: <URL: https://pubs.acs.org/doi/abs/10.1021/acsenergylett.6b00608>.

Sharifian, et al., "Electrochemical carbon dioxide capture to close the carbon cycle," Energy Environmental Science [article], Feb. 2021, DOI:10.1039/DOEE03382K, Retrieved from the Internet: <URL: https://www.researchgate.net/publication/347906795_Electrochemical_carbon_dioxide_capture_to_close_the_carbon_cycle>.

Shaw, et al., "Electrochemical CO2 capture thermodynamics," International Journal of Greenhouse Gas Control, Apr. 2020, vol. 95, Retrieved from the Internet: <URL: https://www.sciencedirect.com/science/article/abs/pii/S175058361930427X>.

Smith, et al., "Pathways to Industrial-Scale Fuel Out of Thin Air from CO2 Electrolysis," Joule, Aug. 21, 2019, pp. 1822-1834, Smith, W. A., Burdyny, T., Vermaas, D. A., & Geerlings, H. (2019). Pathways to Industrial-Scale Fuel Out of Thin Air from CO2 Electrolysis. Joule. DOI:10.1016/j.joule.2019.07.009, Retrieved from the Internet: <URL: https://sci-hub.se/10.1016/j.joule.2019.07.009>.

Stern, et al., "Electrochemically Mediated Separation for Carbon Capture," Energy Procedia [article], Dec. 2011, 9 pages, DOI:10.1016/j.egypro.2011.01.130, Retrieved from the Internet: <URL: https://www.researchgate.net/publication/229312271_Electrochemically_Mediated_Separation_for_Carbon_Capture>.

Stern, et al., "Post-Combustion Carbon Dioxide Capture using Electrochemically-Mediated Amine Regeneration," Energy & Environmental Science [paper], 2013, pp. 2505-2517, vol. 6, DOI:10.1039/C3EE41165F, Retrieved from the Internet: <URL: https://www.researchgate.net/publication/255770830_Post-Combustion_Carbon_Dioxide_Capture_using_Electrochemically-Mediated_Amine_Regeneration>.

Voskian, et al., "Faradaic Electro-Swing Reactive Adsorption for CO 2 Capture," Energy & Environmental Science [article], 2019, 19 pages, DOI: 10.1039/C9EE02412C, Retrieved from the Internet: <URL: https://www.researchgate.net/publication/336155339_Faradaic_Electro-Swing_Reactive_Adsorption_for_CO_2_Capture>.

Walke, et al., "Recovery of CO2 from flue gas using an electrochemical membrane," Gas Separation & Purification, Jun. 1988, pp. 72-76, vol. 2, Issue: 2, Retrieved from the Internet: <URL: https://www.sciencedirect.com/science/article/abs/pii/095042148880015X>.

Wang, et al., "CO2 Capture Using Electrochemically Mediated Amine Regeneration", Industrial & Engineering Chemistry Research [article], 2020, pp. 7087-7096, Retrieved from the Internet: <URL: https://pubs.acs.org/doi/pdf/10.1021/acs.iecr.9b05307>.

Winnick, "Electrochemical membrane gas separation", OSTI.gov [conference—abstract], Dec. 31, 1994, 2 pages, Retrieved from the Internet: <URL: https://www.osti.gov/biblio/183504-electrochemical-membrane-gas-separation>.

Youn, et al., "Carbon dioxide sequestration process for the cement industry," Journal of CO2 Utilization Dec. 2019, pp. 325-334, vol. 34, Retrieved from the Internet: <URL: https://www.sciencedirect.com/science/article/abs/pii/S221298201930410X>.

* cited by examiner

VOLTAGE-SWING METHOD FOR CARBON CAPTURE USING POROUS CARBONS

BACKGROUND

The present invention relates, generally, to the field of alleviating global warming, and more particularly to carbon capture.

As the planet warms, advances in technology are becoming more and more critical to alleviating the buildup of carbon dioxide in Earth's atmosphere. One promising technological field that has the potential to make a significant impact is that of carbon capture. Carbon capture is the process of capturing carbon dioxide before it enters the atmosphere or filtering carbon dioxide out of the atmosphere. Carbon dioxide can be captured and separated from mixed gasses through a variety of different means, such as absorption, adsorption, chemical looping, membrane gas separation, and gas hydration. However, many challenges will have to be overcome in the field before carbon capture can make a significant impact on atmospheric carbon dioxide levels.

SUMMARY

According to at least one embodiment, a method and system for carbon capture through a voltage-swing method is provided. The present invention may include capturing carbon dioxide from a gas mixture through physisorption by applying electrical charges to a sorbent to increase the sorbent's selectivity and adsorption and liberating the carbon dioxide from the sorbent by removing the charges from the sorbent and applying a desorption method to the sorbent.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

As previously described, advances in technology are becoming more and more critical to alleviating the buildup of carbon dioxide in Earth's atmosphere. One promising technological field that has the potential to make a significant impact is that of carbon capture. Carbon capture is the process of capturing carbon dioxide (e.g., in flue gas in a power plant) before it enters the atmosphere or filtering carbon dioxide out of the atmosphere. Carbon dioxide can be captured and separated from mixed gasses through a variety of different means, such as absorption, adsorption, chemical looping, membrane gas separation, and gas hydration. However, many challenges will have to be overcome in the field before carbon capture can make a significant impact on atmospheric carbon dioxide levels.

Adsorption is an important carbon capture technology used in the art. Adsorption is the adhesion of atoms, ions, or molecules from a gas, liquid, or dissolved solid to a surface made of an adsorbent material, called a sorbent. The sorbent may adhere to atoms, ions, or molecules through either a nonbonded electrostatic interaction (along with the van der Waals interaction), called physisorption, or through a chemical bond, called chemisorption. To make an effective sorbent, a material must possess a quality known as selectivity, which is the ability of a sorbent to preferentially adsorb one gas over another gas; materials with low selectivity are largely incapable of isolating carbon dioxide and are therefore not effective for carbon capture. Furthermore, sorbents require a regeneration step to remove the carbon dioxide from the sorbent once it has been collected in order for the sorbent to be reused. One exemplary sorbent is the metal-organic framework (MOF), which captures carbon dioxide using physisorption or chemisorption based on the porous atomic structure of a MOF. The carbon dioxide is then stripped off the MOF using temperature swing adsorption or pressure swing adsorption in a regeneration step. However, MOFs can be very expensive, costing up to five hundred dollars a pound at the time of this writing. Another exemplary sorbent is activated carbon, or amorphous carbon; activated carbon is highly porous, such that one gram of activated carbon could have a surface area greater than three thousand square meters, resulting in very high capacity for capturing carbon dioxide. Additionally, it is cheap, costing at the time of this writing only a few dollars a pound. Activated carbon is also prone to chemical modifications: N- or B-doping, oxidation, hydrogenation, metal doping, polymer functionalization, et cetera. However, unmodified activated carbon is not very selective, reducing its suitability for carbon capture applications.

Another carbon capture technology is absorption, which is the adhesion of atoms, ions, or molecules from a gas, liquid, or dissolved solid to a liquid solution made of an absorbent material, called a solvent. One method of absorption is amine gas treating, which refers to a group of processes utilizing aqueous solutions of various alkylamines to remove carbon dioxide from gases. However, amine gas treating absorbs carbon dioxide by forming chemical bonds between the solvent and the carbon dioxide (chemisorption); chemisorption accordingly requires significant energy to break the chemical bond and desorb carbon dioxide from a sorbent or solvent, resulting in high energy costs for regenerating sorbents or solvents.

Carbon may also be captured using membrane gas filters, which use a number of permeable membranes to block molecules of a certain gas while allowing others to pass through. However, membrane gas filters are limited in performance by the fact that selectivity must be sacrificed for permeability, and vice versa; this makes membrane gas filters unsuitable for carbon dioxide separation from flue gas streams, as in order to achieve levels of selectivity sufficient to preferentially separate carbon dioxide from other gases, a membrane gas filter would have to sacrifice permeability to such an extent that an unfeasibly large number of gas filters would be necessary to achieve useful levels of carbon capture; as a result, mass transport of filters would become a limiting factor and regenerating the spent filters would become very expensive.

As such, it may be advantageous to, among other things, implement a system that captures carbon dioxide electrostatically through physisorption, resulting in significantly lower energy costs to regenerating the sorbent than that of electro-chemical techniques utilizing chemisorption. It may further be advantageous to implement a system that utilizes a voltage-swing method on activated carbon to improve its selectivity to a level that allows for direct air capture and significantly improves adsorption, thereby overcoming the chief drawback of activated carbon and allowing the system to benefit from the low cost and high storage capacity that are inherent to activated carbon. It may further be advantageous to utilize the voltage-swing method in the regeneration step to reduce the selectivity of the activated carbon and thereby reduce the energy requirement of releasing captured carbon dioxide in the regeneration step.

According to at least one embodiment, the invention is a method of capturing carbon dioxide from a gas mixture by applying voltage to a sorbent to increase the sorbent's selectivity and adsorption, and once the sorbent is saturated under applied external conditions (such as pressure and temperature), decreasing the voltage to reduce the sorbent's selectivity and adsorption to facilitate low-energy release of the captured carbon dioxide molecules during a regeneration step. While activated carbon is considered in embodiments of this invention, one skilled in the art would understand any conductive sorbent to have the same adsorption and selectivity benefits of activated carbon. Activated carbon, however, may further yield benefits in terms of cost and low environmental impact.

In some embodiments of the invention, the gas mixture may be any combination of two or more gasses wherein one of the gasses comprises carbon dioxide. The gas mixture may, for example, comprise a flue gas, which may mainly comprise a combination of nitrogen and carbon dioxide. The gas mixture may also be atmospheric air, which may be a combination of nitrogen, oxygen, carbon dioxide, et cetera. In some embodiments of the invention, the system may be used at industrial sites, cement making sites and/or chemical sites where carbon dioxide is released and should be separated from air and captured In some embodiments of the invention, the voltage swing method is a method of altering the properties of activated carbon by applying a charge to the activated carbon. As the charge per carbon atom in porous carbon increases above zero, the adsorption loading of carbon dioxide drastically increases with the voltage, from a loading of around five moles per kilogram at a charge of 0.0 electron per atom to a loading of over twenty moles per kilogram at a charge of 0.1 electron per atom. And because the adsorption loading is so low at or below zero charge density, there may be no need to remove actively the adsorbed gas out of porous carbon at such charge densities. Furthermore, as the charge density increases, so too does the selectivity; unmodified activated carbon has a selectivity of less than 20, but as the charge density increases to 0.1 electron per atom, the selectivity jumps to around 1000 (based on our computer modeling), a fifty-fold increase. Thanks to the high selectivity of charged activated carbon to adsorb molecules with a large charge quadrupole moment (due to the favorable charge-quadrupole interaction), carbon dioxide adsorption is more than that of nitrogen. Selectivity of carbon dioxide over nitrogen can be increased further by releasing the first-adsorbed gas into a second chamber with charged amorphous carbon followed by a second-time adsorption and release; the second-adsorbed gas will have even higher purity. In charged activated carbon, charges might be localized at spike ends or at defects; such heterogenous charge distribution yields stronger local electric fields than homogeneous charging, and these stronger fields may facilitate higher carbon dioxide selectivity and adsorption.

In some embodiments of the invention, the voltage swing method is a method of altering the properties of a sorbent by applying a charge to it; any conductive sorbent may show the same adsorption and selectivity benefits of activated carbon.

In some embodiments of the invention, the sorbent may be any solid material that adsorbs carbon dioxide through physisorption and has increased carbon dioxide adsorption when the material is electrically charged. In other words, any sorbent material where carbon dioxide binds the sorbent because of electric and/or van der Waals forces, instead of through chemisorption, which uses electrochemical means to form molecular bonds between the sorbent and the carbon dioxide. The sorbent may be activated carbon, certain metal organic frameworks (MOFs), or any other suitable sorbent.

The amount of activated carbon needed to remove carbon dioxide from a gas mixture may be expressed as follows: the number of moles of carbon dioxide adsorbed may be represented as $MCO_2=C$ (mol/kg of activated carbon)*m (kg mass of activated carbon). Setting this equal to the number of moles of carbon dioxide in the feed chamber yields the following equation: $MCO_2=V$ (volume in $m^3$ of the chamber)*f ($CO_2$ fraction in the input gas)/0.0224 ($m^3$/mole at SPT) Thus, the volume of air needed to fill the activated carbon with carbon dioxide is: V=0.0224 Cm/f.

In an exemplary embodiment where the system is capturing carbon dioxide from flue gas, f=0.1, then V=4.48 $m^3$ per kg of activated carbon for C=20 mol/kg from our calculations. Since most of the carbon dioxide will be on the activated carbon, the residual will be nearly pure nitrogen, which can be exhausted to the air. The activated carbon will be contaminated with nitrogen. For selectivity S, the ratio of $CO_2/N_2$ on the activated carbon will be Sf. With S~1000 (see above) and f=0.1, the ratio of $CO_2/N_2$ on the activated carbon will be 100, so $CO_2$ will be 99% pure.

In some embodiments of the invention, the system may, after adsorbing carbon dioxide into the sorbent through any of the herein mentioned carbon capture methods or any others, release the first-adsorbed residual gas into a second chamber with charged amorphous carbon followed by a second-time adsorption and release to further increase the sorbent's selectivity of carbon dioxide over nitrogen; the second-adsorbed gas will have even higher purity. For example, where the system is capturing carbon from the atmosphere via direct air capture, f=0.0004, the volume of air needed to contain enough carbon dioxide to fill a kg of activated carbon is 1120 $m^3$, and the ratio of $CO_2/N_2$ on the activated carbon will be 4. For reference, one kilogram of activated carbon distributed on a bed 1 meter square would be 0.4 mm thick at its typical density of 2.5 gm/cc. Such a high volume of air would require a fan to blow the air past the activated carbon so that each kg is exposed to 1120 m³ of air in the time it takes the activated carbon to adsorb the carbon dioxide. The activated carbon in this case may still be highly contaminated with nitrogen, in which case the system may send the captured carbon dioxide and nitrogen mixture to another filtering unit, where the carbon dioxide fraction on the second activated carbon will be S multiplied by the carbon dioxide fraction on the first activated carbon, or $S^2f=400$. Then, the $CO_2$ in the second filtering unit will be 99.75% pure.

The following described exemplary embodiments provide a system, method, and program product to capture carbon dioxide in a mixed gas by increasing the selectivity of a sorbent by applying electrical charging, adhering carbon dioxide to the sorbent via physisorption, and then removing the captured carbon dioxide by reducing the charge on the sorbent.

Figure 1:
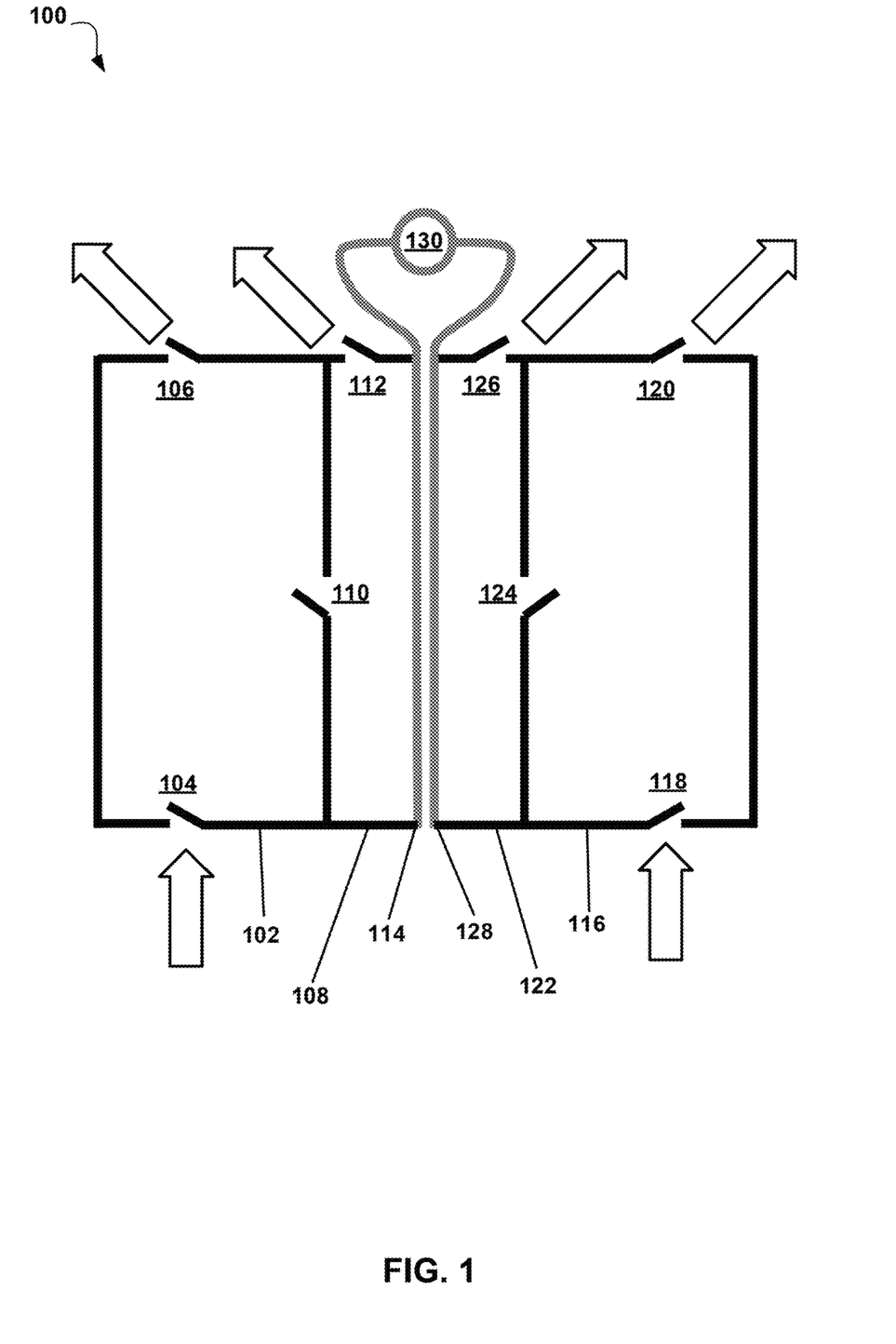
FIG. 1 illustrates an exemplary voltage-swing carbon capture system according to at least one embodiment.

Referring to FIG. 1, an exemplary voltage-swing carbon capture system 100 is depicted according to at least one embodiment. Here, voltage-swing carbon capture system 100 comprises four chambers; a first chamber 102 which comprises an input 104 for receiving a high-pressure gas mixture, an outlet 106 for venting nitrogen, and a valve 110 connecting the first chamber 102 to a second chamber 108. The second chamber 108 comprises an outlet 112 for venting carbon dioxide and a first capacitor plate 114. First capacitor plate 114 may comprise a sorbent that can be charged, for example by a battery. The first capacitor plate 114 may comprise any conductive sorbent including activated carbon, metal-organic framework (MOF), Zeolite, et cetera. Mirroring first chamber 102 is a third chamber 116, which comprises an inlet 118 for receiving a high-pressure gas mixture, an output 120 for venting nitrogen, and a valve 124 connecting the third chamber 116 to a fourth chamber 122. The fourth chamber 122 comprises an outlet 126 for venting carbon dioxide and a second capacitor plate 128. Second capacitor plate 128 may comprise a sorbent that can be charged, for example by a battery. The first capacitor plate 128 may comprise any conductive sorbent. The voltage-swing carbon capture system 100 may further comprise a voltage regulator 130, which is electrically connected with and regulates charges to both of the capacitor plates 114, 128; the capacitor plates 114, 128 may be part of a single capacitor and/or connected such that when one carries a negative charge, the other carries a positive charge and vice versa. Voltage regulator 130 may be connected to a power source such as a battery or outlet. In some embodiments of the invention, for example where the voltage-swing carbon capture system 100 is capturing carbon from atmospheric air, the output 106 may be for venting a gas residue, wherein the gas residue may comprise a gas mixture from which all or most of the carbon dioxide has been removed through the voltage-swing carbon capture process.

Figure 2:
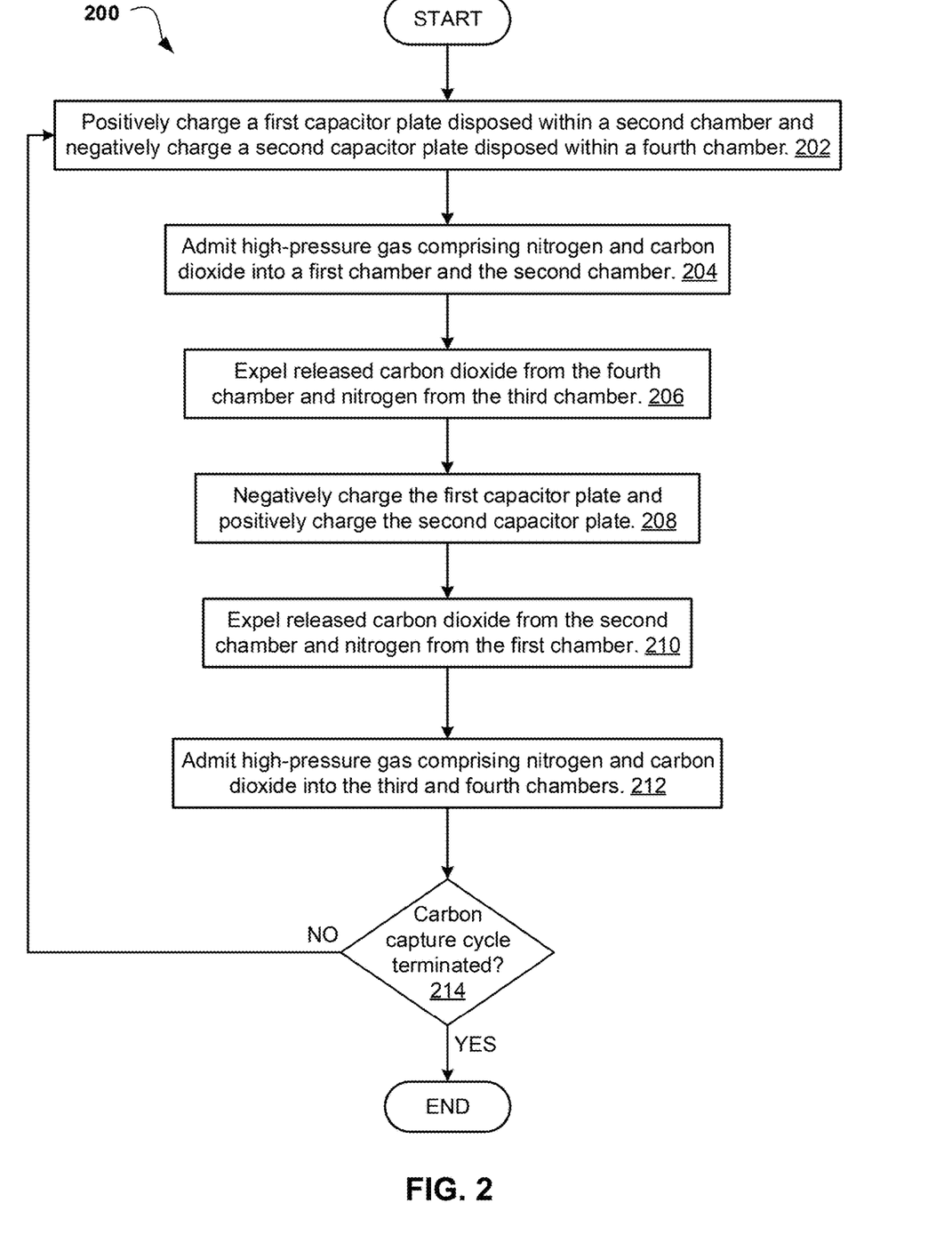
FIG. 2 is an operational flowchart illustrating a voltage-swing carbon capture process according to at least one embodiment.

Referring now to FIG. 2, an operational flowchart illustrating a voltage-swing carbon capture process 200 is depicted according to at least one embodiment. The voltage-swing carbon capture process 200 utilizes a voltage-swing carbon capture system 100 to alternate charge between two sides 114 and 128 of a capacitor plate. At 202, the voltage-swing carbon capture system 100 positively charges a first capacitor plate disposed within a second chamber and negatively charges a second capacitor plate disposed within a fourth chamber. Here, voltage-swing carbon capture system 100 may positively charge a first capacitor plate 114 disposed within a second chamber 108 to improve the selectivity and carbon capture rate of the first capacitor plate 114, and may simultaneously negatively charge, or discharge, a second capacitor plate 128 disposed within a fourth chamber 122 to release captured carbon dioxide from the second capacitor plate 128. The capacitor plates 114, 128 may be sorbents, which may be any conductive solid material that adsorbs carbon dioxide through physisorption. In other words, carbon dioxide binds the sorbent because of electric and/or van der Waals forces, instead of through chemisorption, which uses electrochemical means to form molecular bonds between the sorbent and the carbon dioxide. The sorbent may be activated carbon, conductive metal organic frameworks (MOF), or any other suitable sorbent. By positively charging the capacitor plate 114, the voltage-swing carbon capture system 100 increases the selectivity and adsorption of the capacitor plate 114, allowing the capacitor plate 114 to adsorb a high proportion and quantity of carbon dioxide from the gas mixture in second chamber 108. By negatively charging, or grounding, the second capacitor plate 128, the voltage-swing carbon capture system 100 lowers the selectivity and adsorption loading of the second capacitor plate 128, making it easier to strip carbon dioxide molecules off the second capacitor plate 128, thereby regenerating the second capacitor plate 128.

The voltage-swing carbon capture system 100 may employ any number or type of desorption methods in conjunction with the voltage swing, such as temperature swing adsorption or pressure swing adsorption. Temperature swing adsorption may include heating the sorbent to add sufficient thermal energy for captured molecules to escape the sorbent's surface, while pressure swing adsorption may include lowering the pressure around the sorbent to induce desorption from the sorbent. For example, the high pressure gas mixture may be configured to create a pressure-swing system when the output gases (carbon dioxide, nitrogen, gas residue) are kept at atmospheric or lower pressure, wherein the voltage-swing carbon capture system 100 would comprise high pressure adsorption and low pressure desorption.

At 204, the voltage-swing carbon capture system 100 admits high-pressure gas comprising nitrogen and carbon dioxide into a first chamber 102 and second chamber 108. Here, voltage-swing carbon capture system 100 may close outlet 106 and open input 104 and valve 110 to allow the gas mixture to flow into the first chamber 102 and the second chamber 108, and to capture the carbon dioxide from the gas mixture in the first chamber 102 and second chamber 108. Outputs 106 and 112 may remain closed at this time. The voltage-swing carbon capture system 100 allows the gas mixture to flow from the first chamber 102 to the second chamber 108 through valve 110, so that the gas mixture is exposed to the positively charged first capacitor plate 114; the positively charged first capacitor plate 114 may thereupon begin adsorbing carbon dioxide from the gas mixture in first chamber 102 and second chamber 108 as molecular diffusion moves the component molecules of the gas mixture evenly around both chambers 102 and 108. The gas mixture may be a flue gas, which may be a combination of nitrogen and carbon dioxide. The gas mixture may also be atmospheric air, which may be a combination of nitrogen, oxygen, carbon dioxide, et cetera. The gas mixture may be pressurized to facilitate its movement into the voltage-swing carbon capture system 100, and voltage-swing carbon capture system 100 may reduce the pressure within the first chamber 102 and/or the second chamber 108 to further facilitate movement of the gas mixture. The voltage-swing carbon capture system 100 may maintain the positive charge on the first capacitor plate 114 while admitting the high pressure gas mixture, so as to adsorb as much carbon dioxide from the gas mixture as possible. In some embodiments of the invention, once the first capacitor plate 114 has reached a threshold saturation of carbon dioxide, the voltage-swing carbon capture system 100 may close valve 110 such that the first chamber 102 and the second chamber 108 are isolated from each other, trapping nitrogen in first chamber 102 and ensuring that when carbon dioxide desorbs from the first capacitor plate 114, the carbon dioxide will remain trapped and isolated within second chamber 108; the voltage-swing carbon capture system 100 may further close input 104 to halt the further input of the gas mixture.

At 206, the voltage-swing carbon capture system 100 expels released carbon dioxide from the fourth chamber 122 and nitrogen from the third chamber 116. Here, previously captured carbon dioxide has desorbed from second capacitor plate 128 as a result of the negative charging or grounding and additional desorption methods employed. As such, the fourth chamber 122 may be full of nearly pure carbon dioxide. This carbon dioxide may be released from the system, for example by opening outlet 126. Once released into some sort of repository, the carbon dioxide may be stored, such as for sequestration or industrial use. The voltage-swing carbon capture system 100 may maintain the negative or neutral charge on the second capacitor plate 128 during the duration of the expulsion of carbon dioxide, so as to re-adsorb as little desorbed carbon dioxide as possible. The voltage-swing carbon capture system 100 may release nitrogen from third chamber 116 by opening outlet 120. The nitrogen in third chamber 116 may be gas mixture from which the positively charged second capacitor plate 128 has removed all or most carbon dioxide. Nitrogen may alternatively be herein referring to a nitrogen-rich left over gas residue that remains after the carbon dioxide has been removed from the gas mixture, which may be released into the atmosphere or captured and stored. Once the carbon dioxide has been expelled from fourth chamber 122 and the nitrogen has been expelled from third chamber 116, as determined for example through sensor data or inferred after a pre-determined time period, voltage-swing carbon capture system 100 may close outlets 126 and 120.

At 208, the voltage-swing carbon capture system 100 negatively charges the first capacitor plate 114 and positively charges the second capacitor plate 128. Here, the voltage-swing carbon capture system 100 may switch the polarity of voltage regulator 130 to negatively charge or ground the first capacitor plate 114 to release captured carbon dioxide, and to positively charge the second capacitor plate 128 disposed within the fourth chamber 122 to capture carbon dioxide. Here, by negatively charging or grounding the first capacitor plate 114, the voltage-swing carbon capture system 100 lowers the selectivity and adsorption of the first capacitor plate 114, reducing the energy required to strip carbon dioxide molecules off of the first capacitor plate 114 and thereby reduces the energy required to regenerate the first capacitor plate 114. By positively charging the second capacitor plate 128, the voltage-swing carbon capture system 100 increases the selectivity and adsorption of the second capacitor plate 128, allowing the second capacitor plate 128 to adsorb a high proportion and quantity of carbon dioxide upon exposure to the gas mixture.

The voltage-swing carbon capture system 100 may employ any number or type of desorption methods in conjunction with the negative charging or grounding, such as temperature-swing or pressure-swing. Temperature-swing adsorption may include heating the sorbent to add sufficient thermal energy for captured molecules to escape the sorbent's surface, while pressure-swing adsorption may include lowering the pressure around the sorbent to induce desorption from the sorbent.

At 210, voltage-swing carbon capture system 100 expels released carbon dioxide from the second chamber 108 and nitrogen from the first chamber 102. Here, previously captured carbon dioxide has desorbed from first capacitor plate 114 as a result of the negative or zero charge and any additional desorption methods employed. As such, the second chamber 108 may be full of nearly pure carbon dioxide. The voltage-swing carbon capture system 100 may release this carbon dioxide from third chamber 116 by opening outlet 112, after which the carbon dioxide may be stored, such as for sequestration or industrial use. Meanwhile, with a large proportion of the carbon dioxide adsorbed, the voltage-swing carbon capture system 100 may open outlet 106 to release nitrogen from the first chamber 102, which was the left over after carbon dioxide was adsorbed into the first transistor plate 114. Once the carbon dioxide has been expelled from second chamber 108 and the nitrogen has been expelled from the first chamber 102, as determined for example through sensor data or inferred after a pre-determined time period, voltage-swing carbon capture system 100 may close outlets 106 and 112.

At 212, the voltage-swing carbon capture system 100 admits high-pressure gas comprising nitrogen and carbon dioxide into the third chamber 116. Here, both second chamber 108 and fourth chamber 122 have been emptied of carbon dioxide, the former through venting and the latter through adsorption. The voltage-swing carbon capture system 100 opens input 118 and valve 124 to allow the gas mixture to flow into the third chamber 116 and then into the fourth chamber 122 through valve 124, so that the gas mixture is exposed to the second capacitor plate 128. The gas mixture may be pressurized to facilitate its movement into the voltage-swing carbon capture system 100, and voltage-swing carbon capture system 100 may reduce the pressure within the third chamber 116 and/or the fourth chamber 122 to further facilitate movement of the gas mixture. The voltage-swing carbon capture system 100 may maintain the positive charge on the second capacitor plate 128 while admitting the high pressure gas mixture, so as to adsorb as much carbon dioxide from the gas mixture as possible. In some embodiments of the invention, once the second capacitor plate 128 has reached a threshold saturation of carbon dioxide, the voltage-swing carbon capture system 100 may close valve 124 such that the fourth chamber 122 and the third chamber 116 are isolated from each other, trapping nitrogen in the third chamber 116 and ensuring that when carbon dioxide desorbs from the second capacitor plate 128, the carbon dioxide will remain trapped and isolated within the fourth chamber 122; the voltage-swing carbon capture system 100 may further close input 118 to halt the further input of the gas mixture.

At 214, the voltage-swing carbon capture system 100 determines whether the carbon capture cycle has terminated. In some embodiments of the invention, the voltage-swing carbon capture system 100 may run cyclically for as long as a carbon dioxide gas mixture is being produced, which may be as long as a power plant is burning fuel, or an industrial site is producing gas mixture. The voltage-swing carbon capture system 100 may therefore run continuously until it receives a termination command. The voltage-swing carbon capture system 100 may receive a termination command from an authorized user, where the authorized user may be a user that has been authenticated in one or a combination of ways. The termination command may be a digital transmission received by voltage-swing carbon capture system 100 over a network, and/or may be a particular input entered on a user interface device integrated into voltage-swing carbon capture system 100. According to one implementation, if the voltage-swing carbon capture system 100 determines that the carbon capture cycle has not received a termination command and therefore has not terminated (step 214, "NO" branch), the voltage-swing carbon capture system 100 may continue to step 202 to positively charge a first capacitor plate 114 disposed within a second chamber 108 and negatively charge a second capacitor plate 128 disposed within a fourth chamber 122. If the voltage-swing carbon capture system 100 determines that the voltage-swing carbon capture system 100 has received a termination command from an authorized user, and as a result the carbon capture cycle has been terminated (step 214, "YES" branch), the voltage-swing carbon capture system 100 may terminate the voltage-swing carbon capture process 200.

Figure 3A:
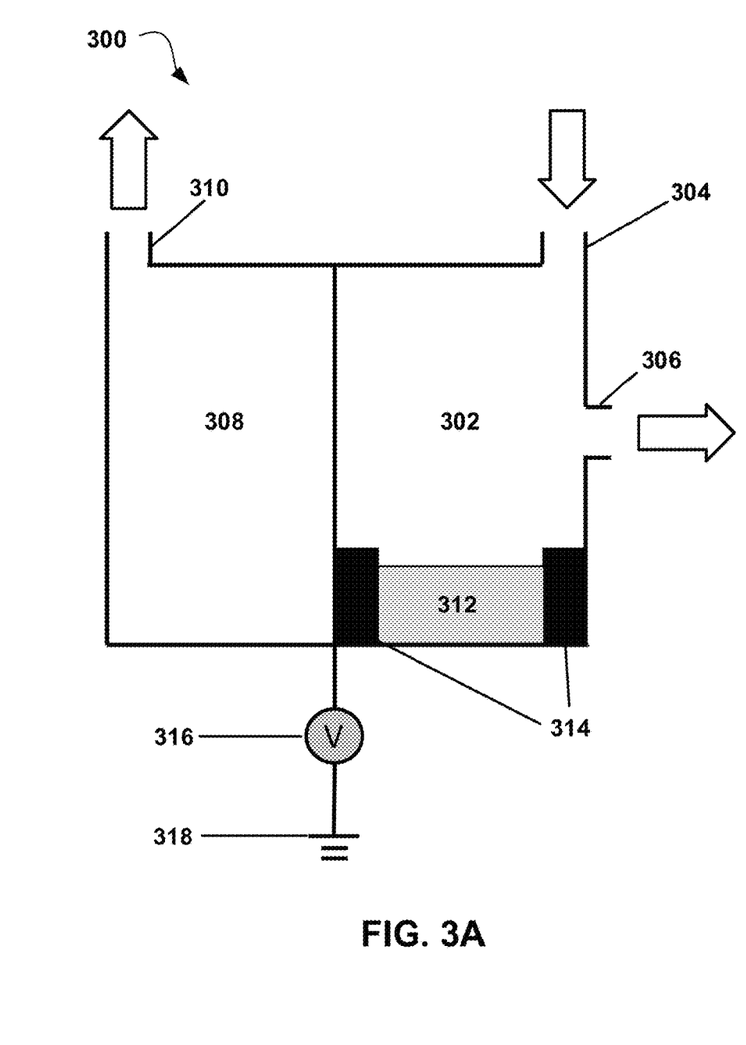
FIG. 3A illustrates an exemplary voltage-swing carbon capture system according to at least one embodiment.

Referring now to FIG. 3A, an exemplary voltage-swing carbon capture system 300 is depicted according to at least one embodiment. Here, the voltage-swing carbon capture system 300 comprises two chambers, a first chamber 302 comprising an inlet 304 for a gas mixture which may be atmospheric air or flue gas and an outlet 306 for venting residue gas, and a second chamber 308 comprising an outlet 310 for regenerated gas. Disposed within the first chamber is a porous carbon adsorber 312, which may be a sorbent comprised of activated carbon and which may in turn be disposed within a conductive container 314 which may be slid between the first chamber 302 and the second chamber 308. The voltage-swing carbon capture system 300 may be electrically connected to a voltage source 316 and a ground 318.

Figure 3B:
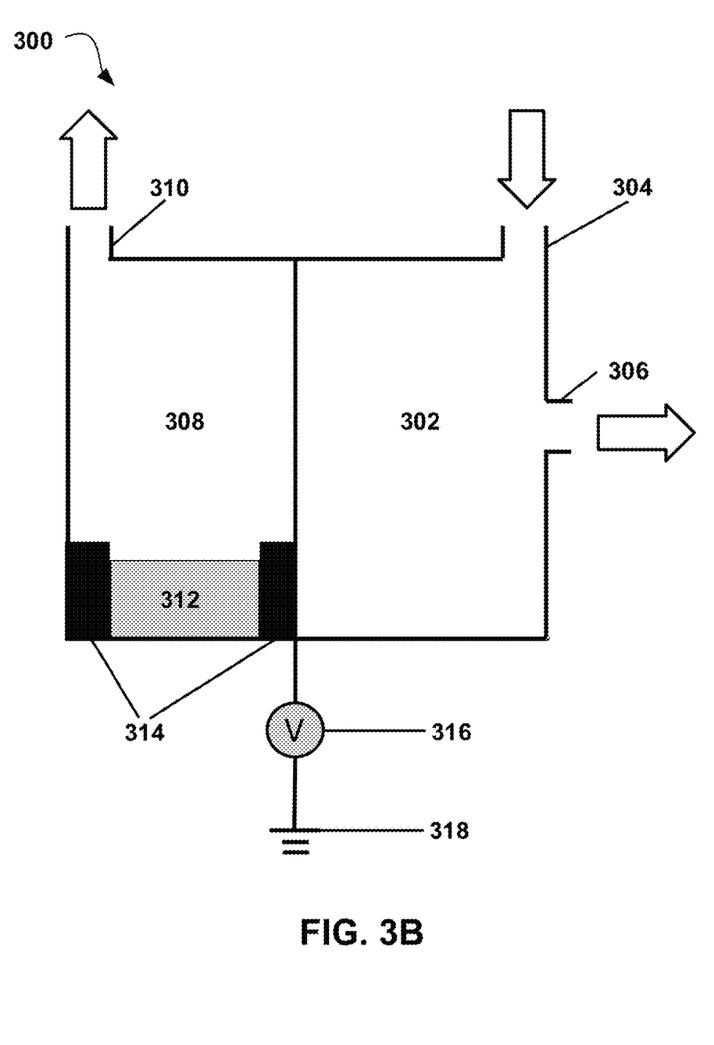
FIG. 3B illustrates an exemplary voltage-swing carbon capture system according to at least one embodiment.

Referring now to FIG. 3B, an exemplary voltage-swing carbon capture system 300 is depicted according to at least one embodiment. FIG. 3B represents the voltage-swing carbon capture system 300 in a state during the voltage swing carbon capture process where the porous carbon adsorber 312 has shifted from first chamber 302 to second chamber 308.

Figure 4:
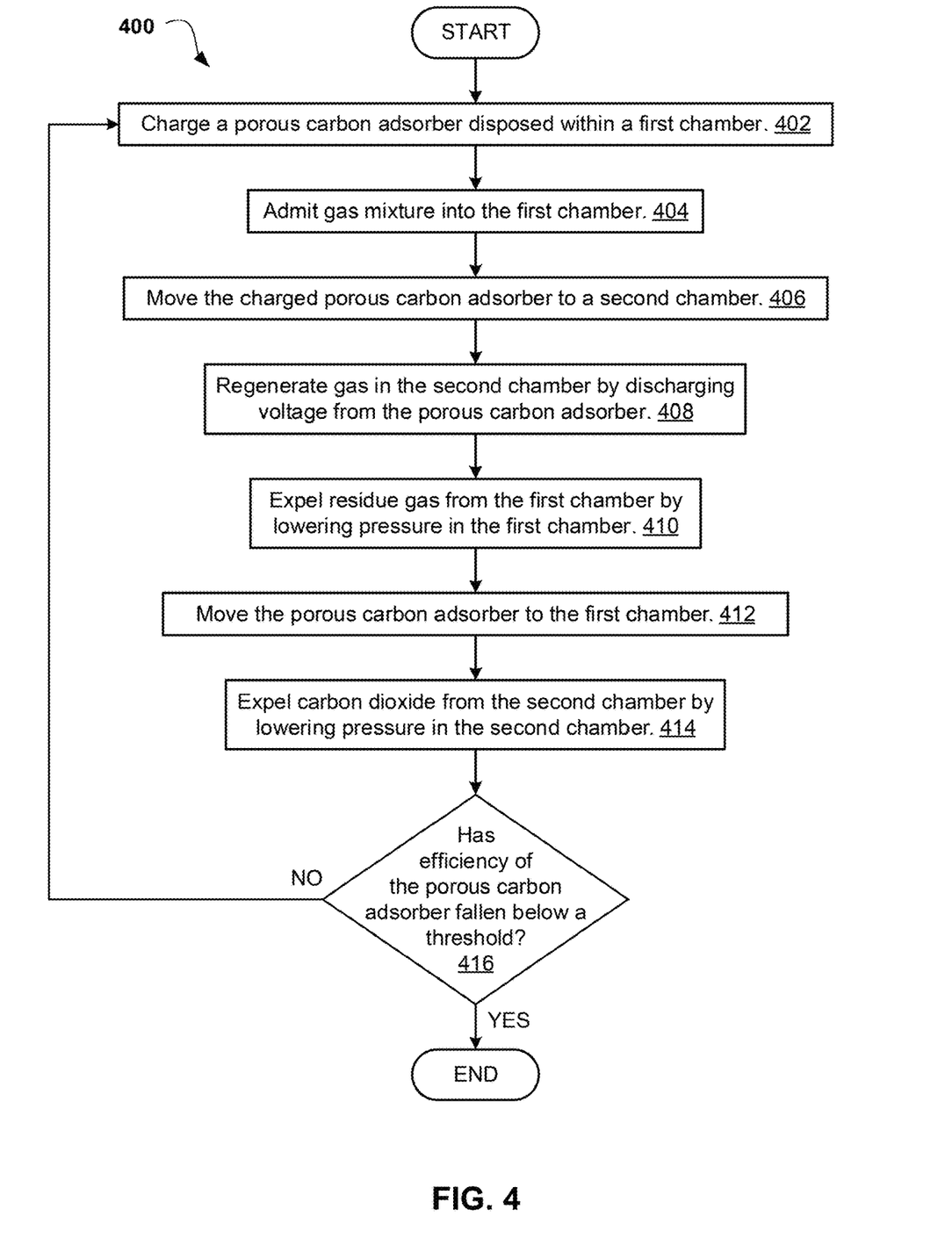
FIG. 4 is an operational flowchart illustrating a voltage-swing carbon capture process according to at least one embodiment.

Referring now to FIG. 4, an operational flowchart illustrating a voltage-swing carbon capture process 400 is depicted according to at least one embodiment. The voltage-swing carbon capture process 400 moves a porous carbon adsorber 312 between two chambers 302, 308, moving carbon dioxide from the first chamber 302 to the second chamber 308. At 402, the voltage-swing carbon capture system 300 charges a porous carbon adsorber 312 disposed within the first chamber 302. Here, the voltage-swing carbon capture system 300 may apply, via voltage source 316, a uniform positive electric charge to porous carbon adsorber 312; the voltage-swing carbon capture system 300 may charge the porous carbon adsorber 312 to 0.1 electron charge per atom for example, thereby raising the adsorption to approximately 20 mol/kg according to our computer modeling. As 20 mol/kg is close to saturated value, increasing the charge more may not necessarily capture much more carbon dioxide. However, the charge at saturation could be different for different activated carbon structures, so deviations from this value may be contemplated without departing from the scope of the invention.

At 404, the voltage-swing carbon capture system 300 admits a gas mixture into the first chamber 302. The gas mixture may be flue gas or atmospheric air. Here, the voltage-swing carbon capture system 300 opens inlet 304 to admit the gas mixture, which may be pressurized to facilitate its movement through voltage-swing carbon capture system 300. This gas mixture may then come into contact with the charged porous carbon adsorber 312, which may adsorb the carbon dioxide from the gas mixture. In this stage, the outlet 306 may be closed.

At 406, the voltage-swing carbon capture system 300 moves the charged porous carbon adsorber 312 to a second chamber 308. The charged porous carbon adsorber 312 may be seated within a conductive container 314 which may be slid, using pneumatic, motorized, or any other means between first chamber 302 to second chamber 308. The charged porous carbon adsorber 312 may be moved when the charged porous carbon adsorber 312 is saturated with carbon dioxide, which may be affirmatively detected by sensors or may be approximated as a regular interval for each cycle depending on the input rate of the input gas mixture and the adsorption rate of the charged porous carbon adsorber 312. The voltage-swing carbon capture system 300 may thereby shuttle the captured carbon dioxide out of first chamber 302 and leave a gas residue that comprises the original gas mixture but is carbon dioxide deficient.

At 408, the voltage-swing carbon capture system 300 regenerates gas in the second chamber 308 by discharging voltage from the porous carbon adsorber 312. Here, the porous carbon adsorber 312 is saturated with carbon dioxide from the first chamber 302. The voltage-swing carbon capture system 300 discharges the porous carbon adsorber 312, such that its electric charge is reduced to zero, which in turn reduces the selectivity and adsorption of the porous carbon adsorber 312 and reduces the energy cost of liberating the captured carbon dioxide from the surface of the porous carbon adsorber 312 and reduces the efficacy and rate with which the porous carbon adsorber 312 may re-adsorb carbon dioxide that has been previously liberated from it. The voltage-swing carbon capture system 300 may remove the captured carbon dioxide from the surface of the porous carbon adsorber 312 by using any number or combination of desorption techniques, such as pressure swing adsorption and temperature swing adsorption. The voltage-swing carbon capture system 300, through desorption/regeneration of the porous carbon adsorber 312, may fill second chamber 308 with the liberated carbon dioxide gas.

At 410, the voltage-swing carbon capture system 300 expels residue gas from the first chamber 302 by lowering pressure in the first chamber 302. Here, the first chamber 302 may contain residue gas, which may be the remainder of the original gas mixture once the porous carbon adsorber 312 has adsorbed and removed the carbon dioxide from the gas mixture. The voltage-swing carbon capture system 300 may expel this residue gas, for example by opening outlet 306. The residue gas may be vented directly into the atmosphere or captured for sequestration or to be used for other purposes. The voltage-swing carbon capture system 300 may expel the residue gas by lowering the pressure outside the outlet 306 such that the gas escapes.

At 412, the voltage-swing carbon capture system 300 moves the porous carbon adsorber 312 to the first chamber 302. Here, voltage-swing carbon capture system 300 moves the discharged and newly regenerated porous carbon adsorber 312 from the second chamber 308 to the first chamber 302, there to be charged anew and begin adsorbing additional carbon dioxide from the gas mixture.

At 414, the voltage-swing carbon capture system 300 expels carbon dioxide from a second chamber 308 by lowering pressure outside the outlet 310. Here, voltage-swing carbon capture system 300 opens outlet 310 to release the contents of chamber 308, which may be carbon dioxide desorbed from porous carbon adsorber 312 during the regeneration process. The carbon dioxide may be sequestered or used in industrial applications.

At 416, the voltage-swing carbon capture system 300 determines whether the efficiency of the porous carbon adsorber 312 has fallen below a threshold. The threshold may represent the efficiency by which the porous carbon adsorber 312 separates carbon dioxide from the gas mixture and may be measured by measuring the proportion of carbon dioxide remaining in the gas residue expelled from outlet 306. According to one implementation, if the voltage-swing carbon capture system 300 determines that the efficiency of the porous carbon adsorber 312 has not fallen below a threshold (step 416, "NO" branch), the voltage-swing carbon capture system 300 may continue to step 402 to charge the porous carbon adsorber 312 disposed within the first chamber. If the voltage-swing carbon capture system 400 determines that the efficiency of the porous carbon adsorber 312 has fallen below a threshold (step 416, "YES" branch), the voltage-swing carbon capture system 300 may terminate the voltage-swing carbon capture process 400. In some embodiments of the invention, the voltage-swing carbon capture system 300 may alternately or additionally determine whether the carbon capture cycle has terminated by determining whether the voltage-swing carbon capture system 300 has received a termination command from an authorized user.

It may be appreciated that FIGS. 1-4 provide only illustrations of individual implementations and do not imply any limitations with regard to how different embodiments may be implemented. Many modifications to the depicted environments may be made based on design and implementation requirements. For example, in at least one embodiment of the invention, only one side of the voltage-swing carbon capture system 100 may be employed, with chambers 102 and 108, input 104, valve 110 and outputs 106 and 112. The capacitor plate 114 may alternate between positive charge and negative or zero charge with adsorption of carbon dioxide occurring during the phase of positive charge and desorption of carbon dioxide during the phase of negative or zero charge. Input 104 and valve 110 may be opened and outputs 106 and 112 may be closed during the phase of positive charge to admit high-pressure gas comprising nitrogen and carbon dioxide, while input 104 and valve 110 may be closed and outputs 106 and 112 may be opened during the phase of negative or zero charge to release the separated gases.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for carbon capture, the method comprising:
    capturing carbon dioxide from a gas mixture by applying a positive electrical charge to a sorbent to increase a selectivity and adsorption of a sorbent; and
    responsive to the capturing, liberating the carbon dioxide from the sorbent by removing the positive electrical charge from the sorbent and applying a desorption method to the sorbent, wherein the desorption methods include pressure-swing and temperature-swing.

2. The method of claim 1, wherein the sorbent comprises activated carbon, a conductive metal-organic framework (MOF), or a conductive zeolite.

3. The method of claim 1, wherein the sorbent captures the carbon dioxide from the gas mixture through physisorption.

4. The method of claim 1, wherein the gas mixture is flue gas or atmospheric air.

5. The method of claim 1, wherein the capturing is responsive to determining that an efficiency of the sorbent does not fall below a threshold value.

6. The method of claim 1, wherein the sorbent comprises activated carbon and the positive electrical charge comprises a charge density of 0.1 electron per atom in the sorbent.

7. A method for carbon capture, the method comprising:
    providing a first chamber, the first chamber comprising a first capacitor plate; providing a second chamber, the second chamber comprising a second capacitor plate, the first capacitor plate having an opposing charge from the second capacitor plate, such that when the first capacitor plate is negatively charged, the second capacitor plate is positively charged, and when the first capacitor plate is positively charged, the second capacitor plate is negatively charged, and wherein the first capacitor plate and the second capacitor plate comprise a sorbent;
    capturing carbon dioxide from a gas mixture utilizing the positively charged first capacitor plate or the positively charged second capacitor plate;
    desorbing previously captured carbon dioxide utilizing the negatively charged first capacitor plate or the negatively charged second capacitor plate via one or more desorption methods including pressure-swing and temperature-swing;
    alternating the charge of the first capacitor plate and the second capacitor plate at regular intervals.

8. The method of claim 7, wherein the sorbent comprises activated carbon, a conductive metal-organic framework (MOF), or a conductive zeolite.

9. The method of claim 7, wherein the sorbent captures carbon dioxide from the gas mixture through physisorption.

10. The method of claim 7, wherein the gas mixture is flue gas or atmospheric air.

11. The method of claim 7, wherein the capturing is responsive to determining that an efficiency of the sorbent does not fall below a threshold value.

12. The method of claim 7, wherein the sorbent comprises activated carbon and wherein the positively charged first capacitor plate or the positively charged second capacitor plate have a charge density of 0.1 electron per atom of sorbent.

13. A method for carbon capture, the method comprising:
    capturing carbon dioxide from a gas mixture to produce a residue gas by applying a positive electrical charge to a sorbent disposed within a first chamber to increase a selectivity and an adsorption of the sorbent;
    moving the charged sorbent to a second chamber;
    discharging the charged sorbent;
    desorbing captured carbon dioxide into the second chamber from the discharged sorbent;
    expelling the residue gas from the first chamber;
    moving the discharged sorbent to the first chamber; and
    expelling the carbon dioxide from the second chamber.

14. The method of claim 13, wherein the sorbent comprises activated carbon, a conductive metal-organic framework (MOF), or a conductive zeolite.

15. The method of claim 13, wherein the sorbent captures carbon dioxide from the gas mixture through physisorption.

16. The method of claim 13, wherein the desorbing is performed using desorption methods including pressure-swing and temperature-swing.

17. The method of claim 13, wherein the gas mixture is flue gas or atmospheric air.

18. The method of claim 13, wherein the capturing is responsive to determining that an efficiency of the sorbent does not fall below a threshold value.

\* \* \* \* \*